United States Patent [19]
Iwata

[11] Patent Number: 5,977,673
[45] Date of Patent: Nov. 2, 1999

[54] ARMATURE SHAFT SUPPORT STRUCTURE FOR USE IN AN ELECTRIC MOTOR

[75] Inventor: Masato Iwata, Kiryu, Japan

[73] Assignee: Mitsuba Corporation, Kiryu, Japan

[21] Appl. No.: 08/904,952

[22] Filed: Aug. 1, 1997

[30] Foreign Application Priority Data

Aug. 8, 1996 [JP] Japan ..................................... 8-226043

[51] Int. Cl.⁶ ................................................. H02K 15/00
[52] U.S. Cl. .................................. 310/90; 310/42; 29/596
[58] Field of Search ........................... 310/90, 42; 29/596

[56] References Cited

U.S. PATENT DOCUMENTS

| | | | |
|---|---|---|---|
| 4,899,432 | 2/1990 | Adam et al. ............................. | 310/42 |
| 5,223,756 | 6/1993 | Bello ....................................... | 310/42 |
| 5,272,803 | 12/1993 | Harrison et al. ........................ | 29/596 |

*Primary Examiner*—Nestor Ramirez
*Assistant Examiner*—Burt Mullins
*Attorney, Agent, or Firm*—Oliff & Berridge, PLC

[57] ABSTRACT

An electric motor is constructed by tightening set bolts to secure a yoke opened at one end to a bracket mounted on the yoke open end. The outer ring of bearings is press-fitted into the yoke, the inner ring of the bearings is press-fitted around an armature shaft, and the bearings are free from an undue excessive axial load during the tightening the set bolts, without the need for fixing the outer ring to the yoke. A gap between the inner ring of the bearings and a step portion of the armature shaft for restricting the displacement of the inner ring toward the yoke open end, or a gap between the outer ring of the bearings and the closed end of a bearing housing for restricting the displacement of the outer ring in the direction opposite the direction toward the yoke open end, or the sum of both gaps, prior to tightening the set bolts, is set to be greater than the axial deformation of the yoke resulting from the tightening of the set bolts.

3 Claims, 14 Drawing Sheets

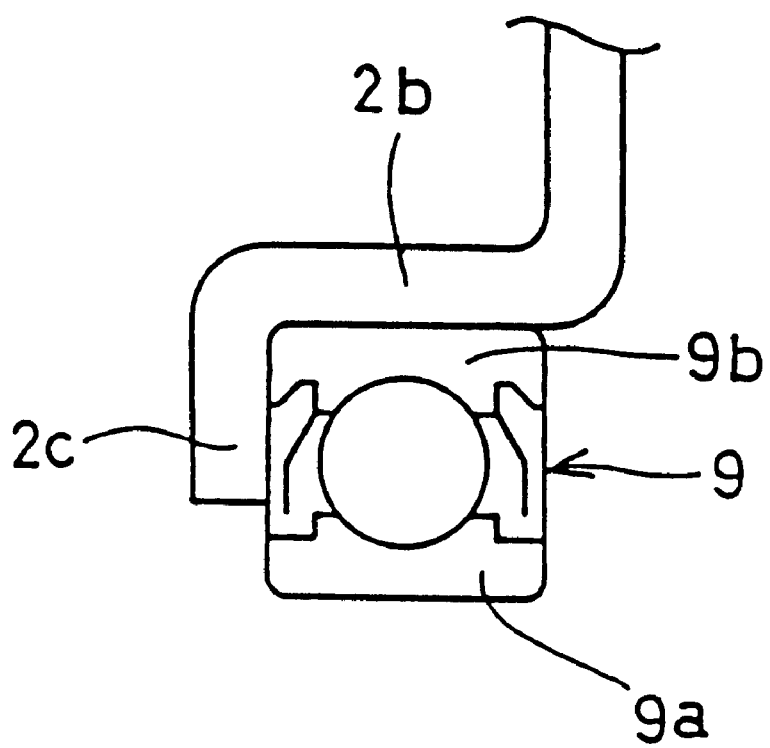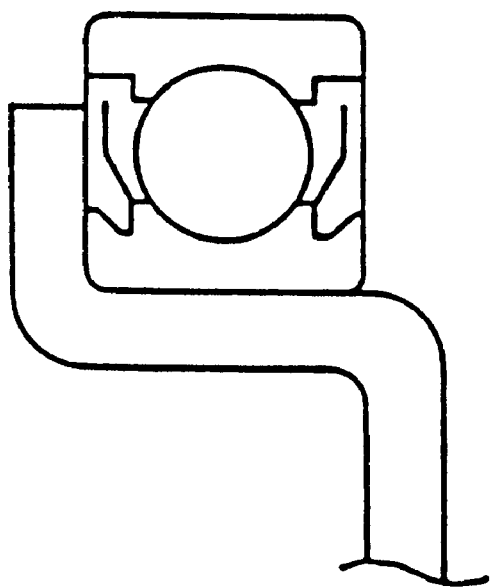
FIG. 6

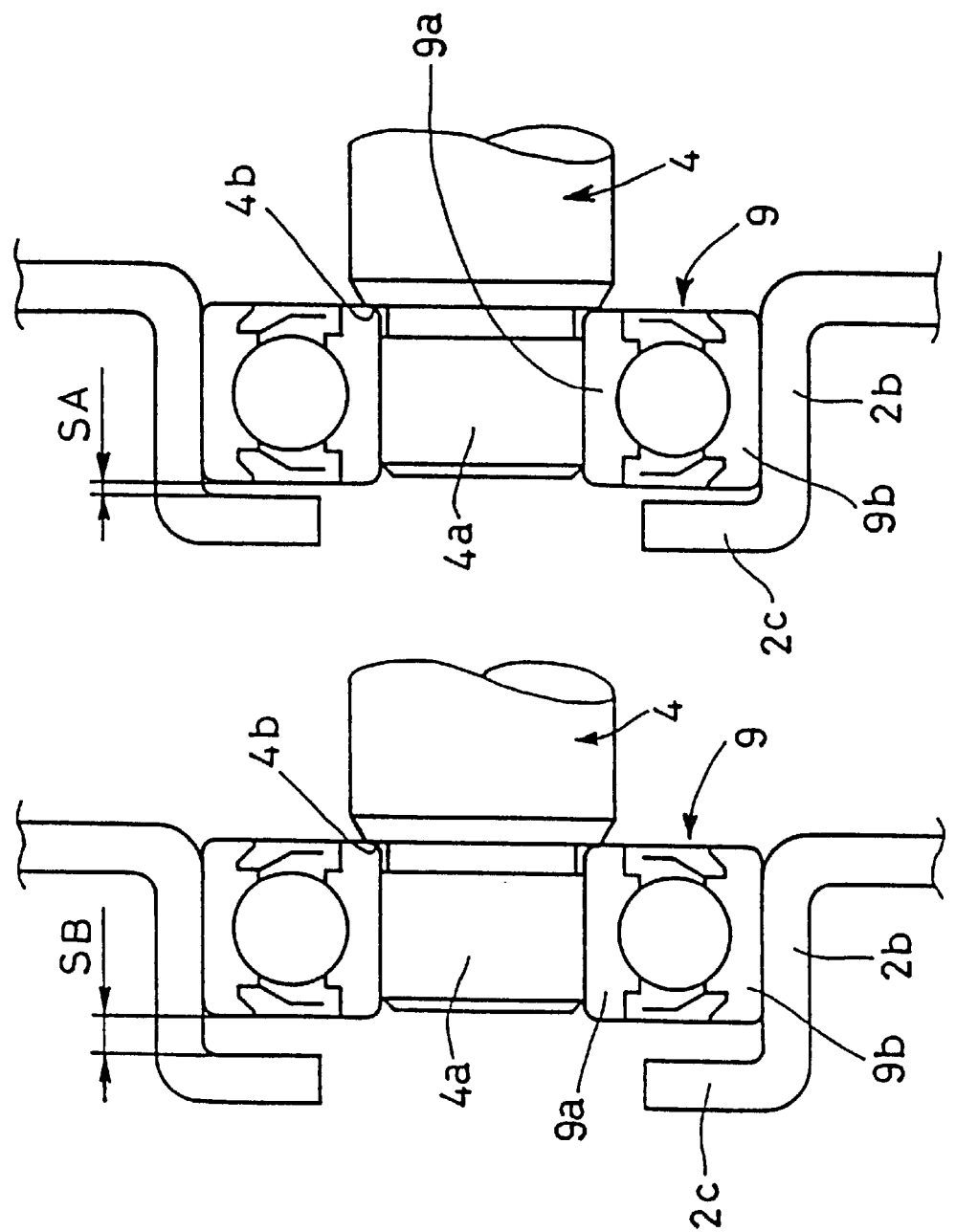

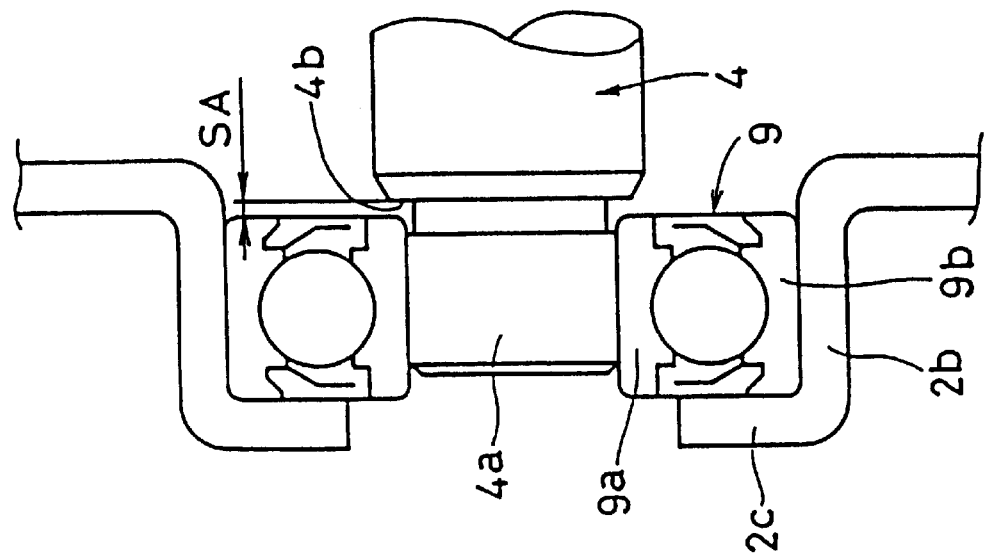
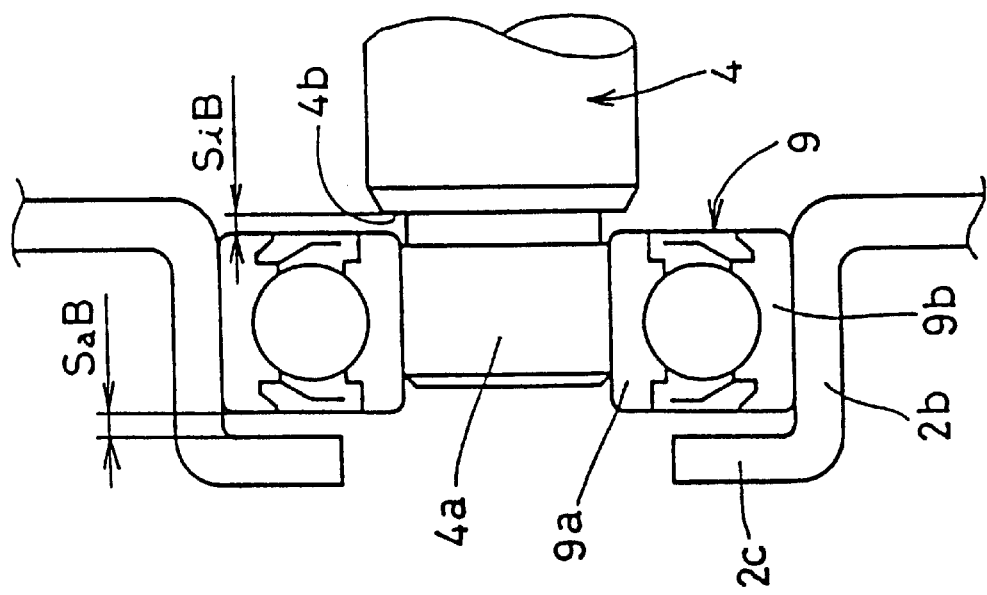

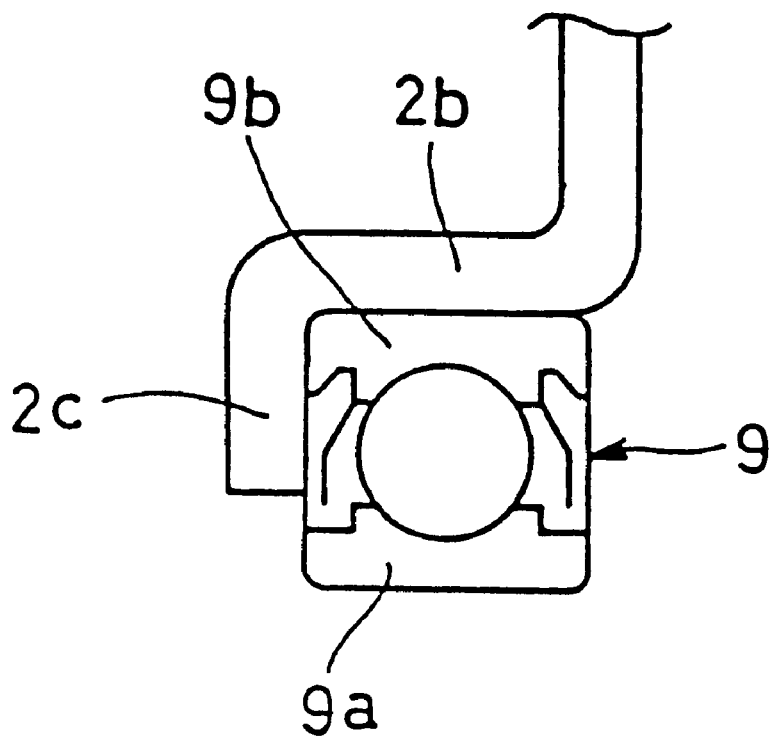
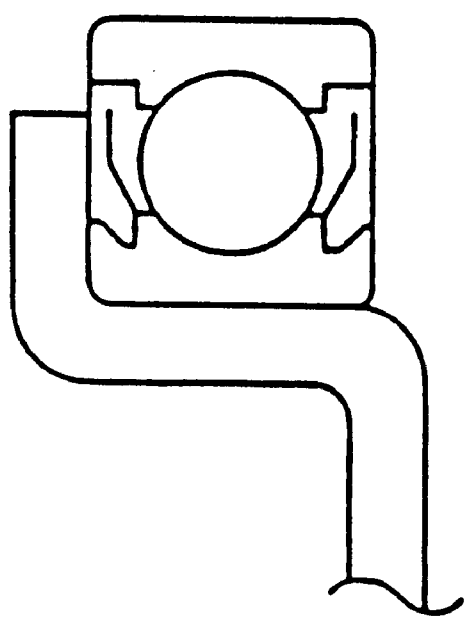
FIG. 12
PRIOR ART ative shaft support structure for use in an electric motor

BACKGROUND OF THE INVENTION

1. Field of the Invention

The present invention relates to an electric motor used on board a vehicle, and more particularly, to a motor armature shaft support structure for use in the motor.

2. Description of the Related Art

When an armature shaft is rotatably supported by bearings on a yoke or a bracket in this type of motor, axial and radial displacements of the bearings need to be restricted. Particularly in a motor for driving a piston used in an anti-lock braking device in which a radial load may act on its armature shaft, consideration should be given to restricting the radial motion of bearings. As disclosed in Japanese Unexamined Patent Publication No. 7184344, grooves are provided where the outer ring of bearings and the housing of the bearings are installed, and resin is applied into the grooves to restrict the axial and radial motions of the bearings. In this method, however, resin must have a sufficient durability. With a long period of service, the resin ages, thereby reducing the effectiveness of the resin in restricting movement of the bearings. Furthermore, an additional manufacturing step for inserting resin into the grooves is required, lowering the efficiency of production.

The inventor of this invention has learned that the problem of the axial and radial displacements of an armature shaft is resolved by press-fitting the armature shaft into the inner ring of bearings with the outer ring of bearings press-fitted in the yoke and bracket.

As shown in FIG. 10, some motors employ a cylindrical yoke 2 opened at one end and closed at the other end, and set bolts 16 are screwed in from the side of the closed end of the yoke 2a to secure the yoke 2 to a bracket 3. The outer ring 9b of bearings 9 is press-fitted into the yoke 2 while an armature shaft 4 is press-fitted into the inner ring 9a of the bearings 9. This arrangement suffers the following problem.

When the outer ring 9b of the bearings 9 is press-fitted into a bearing housing 2b formed at the closed end 2a of the yoke 2, stress in excess of permissible level may be radially applied to the bearings 9. Since the bearings 9 are ball bearings, they may be damaged under such excess radial stress and may malfunction. For this reason, the press-fit load on the outer ring 9b, (P1,) needs to be smaller than the permissible radial load, PR (thus, P1<PR). Since the dimensions of the bearing housing 2b vary within a rated tolerance, the press-fit load P1 of the outer ring 9b is different from product to product within a range below the permissible radial load PR. With the outer ring 9b press-fitted, it remains abutting the closed end 2c of the bearing housing 2b (see FIG. 12).

Then, the armature shaft 4 is press-fitted into the inner ring 9a of the bearings 9 already press-fitted into the bearing housing 2b, using a jig E that may be inserted from the bearing housing closed end 2c, as shown in FIG. 11. If the press-fit load P2 of the inner ring 9a is greater than the permissible axial load PA of the bearings 9, a load in excess of the permissible axial load PA acts on the bearings 9 when the opened end of the yoke 2 abuts the bracket 3, and the bearings 9 may be damaged. The press-fit load P2 of the inner ring 9a must be set smaller than the permissible axial load PA (P2<PA).

In conventional electric motors, the assembly of the inner and outer rings 9a, 9b of the bearings 9, the yoke 2 and the armature shaft 4 suffers variations in the relationship of design parameters as follows.

a) Press-fit load of inner ring<press-fit load of outer ring<constant pressure load of press<permissible axial load (P2<P1<PP<PA).

b) Press-fit load of outer ring<press-fit load of inner ring<constant pressure load of press<permissible axial load (P1<P2<PP<PA).

c) Press-fit load of inner ring<constant pressure load of press<press-fit load of outer ring<permissible axial load (P2<PP<P1<PA).

d) Press-fit load of inner ring<constant pressure load of press<permissible axial load<press-fit load of outer ring (P2<PP<PA<P1)

The constant pressure load PP of a press or jig means a load limit involved in the press-fitting of the inner ring 9a of the bearings 9, and is set to be greater than the press-fit load P2 of the inner ring 9a but smaller than the permissible axial load PA of the bearings (thus, P2<PP<PA).

In a) and b) of the above cases a)–d), the press-fit load P1 of the outer ring 9b is smaller than the constant pressure load PP of the press (P1<PP). Now, the inner ring 9a is press-fitted around the armature shaft 4. When the inner ring 9a is further pressed even after the open end of the yoke 2 abuts the bracket 3, the outer ring 9b moves along with the inner ring 9a toward the open end of the yoke, because the press-fit load P1 of the outer ring 9b is smaller than the constant pressure load PP. This movement is stopped by a step portion 4b formed on the armature shaft 4 when the inner ring 9a touches it, and thus pressing of the inner ring 9a by the jig E stops when the constant pressure load PP of the press is reached. A gap S is left between the closed end 2c of the bearing housing 2 and the outer ring 9b, because the bearings 9 are shifted toward the open end of the yoke 2 (see FIG. 13(X)).

When the set bolts 16 are tightened by a constantly controlled torque to secure the yoke to the bracket 3, the yoke 2 is deformed to be shortened in its axial length. The quantity of deformation D may be greater than the gap S (D>S). If it is so, the outer ring 9b of the bearings 9 is urged toward the yoke open end by the closed end 2c of the bearing housing, though the inner ring 9a is already in contact with the step portion 4b and is unable to move. A load above the permissible axial load PA may act between the inner ring 9a and the outer ring 9b, possibly breaking the bearings 9 (see FIG. 13(Y)).

In cases c) and d), the press-fit load P1 of the outer ring 9b is greater than the constant pressure load PP of the press (P1>PP). In the press-fitting of the inner ring 9a around the armature shaft, the inner ring 9a may be further pressed after the open end of the yoke 2 abuts the bracket 3. Since the press-fit load P1 of the outer ring 9b is greater than the constant pressure load PP of the press, the outer ring 9b remains still, and thus neither the inner ring 9a nor the outer ring 9b moves. When the constant pressure load PP is reached, the pressing of the inner ring 9a by the jig E is stopped. The gap S is left between the inner ring 9a and the step portion 4b of the armature shaft 4 (see FIG. 14(X)).

When the set bolts 16 are tightened by a constantly controlled torque to secure the yoke to the bracket 3, the yoke 2 is deformed to be shortened in its axial length. The outer ring 9b of the bearings 9 is urged toward the yoke open end by the closed end 2c of the bearing housing, and thus both the inner ring 9a and the outer ring 9b are moved toward the yoke open end. If the deformation of the yoke 2 is greater than the gap S (D>S), the outer ring 9b is urged by the closed end 2c of the bearing housing toward the yoke open end even after the inner ring 9a touches and is then restricted by the step portion 4b of the armature shaft 4. As a result, a load above the permissible axial load PA may act between the inner ring 9a and the outer ring 9b, possibly breaking the bearings 9 (see FIG. 14(Y)).

In any of the cases a) through d), there is a possibility that a load above the permissible axial load PA of the bearings acts when the set bolts are tightened. To resolve this problem, after the outer ring is press-fitted into the bearing housing, the side of the outer ring of the bearings toward the yoke open end is secured to the yoke through caulking, for example, with the outer ring abutting the closed end of the bearing housing so that the outer ring does not move during the press-fitting of the inner ring around the armature shaft. In this method, however, an additional manufacturing step of caulking is required, lowering the efficiency of production.

SUMMARY OF THE INVENTION

Accordingly, it is an object of the present invention to resolve the above problem.

The armature shaft support structure for use in an electric motor, which includes a cylindrical yoke opened at one end, a bracket mounted at the open end of the yoke, and set bolts that are screwed in and tightened from the closed end of the yoke to secure the yoke to the bracket, comprises bearings, a bearing housing that is formed in the closed end of the yoke, and an armature shaft which is at one end rotatably supported by the bearings at the bearing housing. An outer ring of the bearings is press-fitted into the bearing housing and an inner ring of the bearings is press-fitted around the armature shaft. The armature shaft at one end has an inner ring receiving portion that restricts the displacement of the inner ring toward the yoke open end while the bearing housing has an outer ring receiving portion that restricts the displacement of the outer ring in the direction opposite to the direction toward the yoke open end. One of an inner ring gap between the inner ring receiving portion and the bearings opposing the inner ring receiving portion, an outer ring gap between the outer ring receiving portion and the bearings opposing the outer ring receiving portion, and the sum of the inner ring gap and the outer ring gap, in a state prior to tightening of the set bolts to secure the yoke to the bracket, is set to be greater than the axial deformation of the yoke arising from the tightening of the set bolts.

The armature shaft support structure for use in an electric motor, which includes a cylindrical yoke opened at one end, a bracket mounted at the open end of the yoke, and set bolts that are screwed in and tightened from the closed end of the yoke to secure the yoke to the bracket, comprises bearings, a bearing housing that is formed in the closed end of the yoke, and an armature shaft which is at one end rotatably supported by the bearings at the bearing housing. An outer ring of the bearings is press-fitted into the bearing housing and an inner ring of the bearings is press-fitted around the armature shaft. The armature shaft at one end has an inner ring receiving portion that restricts the displacement of the inner ring toward the yoke open end while the bearing housing has an outer ring receiving portion that restricts the displacement of the outer ring in the direction opposite to the direction toward the yoke open end. A gap is left at least either between the inner ring receiving portion and the bearings opposing the inner ring receiving portion or between the outer ring receiving portion and the bearings opposing the outer receiving portion, when the set bolts are tightened to secure the yoke to the bracket.

BRIEF DESCRIPTION OF THE DRAWINGS

FIG. 6 is an enlarged view showing a first bearing section with its outer ring press-fitted;

FIGS. 7(X) and 7(Y), corresponding to cases a) and b), are an enlarged view of the first bearing section with its inner ring press-fitted and an enlarged view of the first bearing section with its set bolts tightened, respectively;

FIGS. 9(X) and 9(Y), corresponding to case f), are an enlarged view of the first bearing section with its inner ring press-fitted and an enlarged view of the first bearing section with its set bolts tightened, respectively;

FIG. 12 is an enlarged view of the prior art showing bearings with their outer ring press-fitted;

DESCRIPTION OF THE PREFERRED EMBODIMENTS

Figure 1:
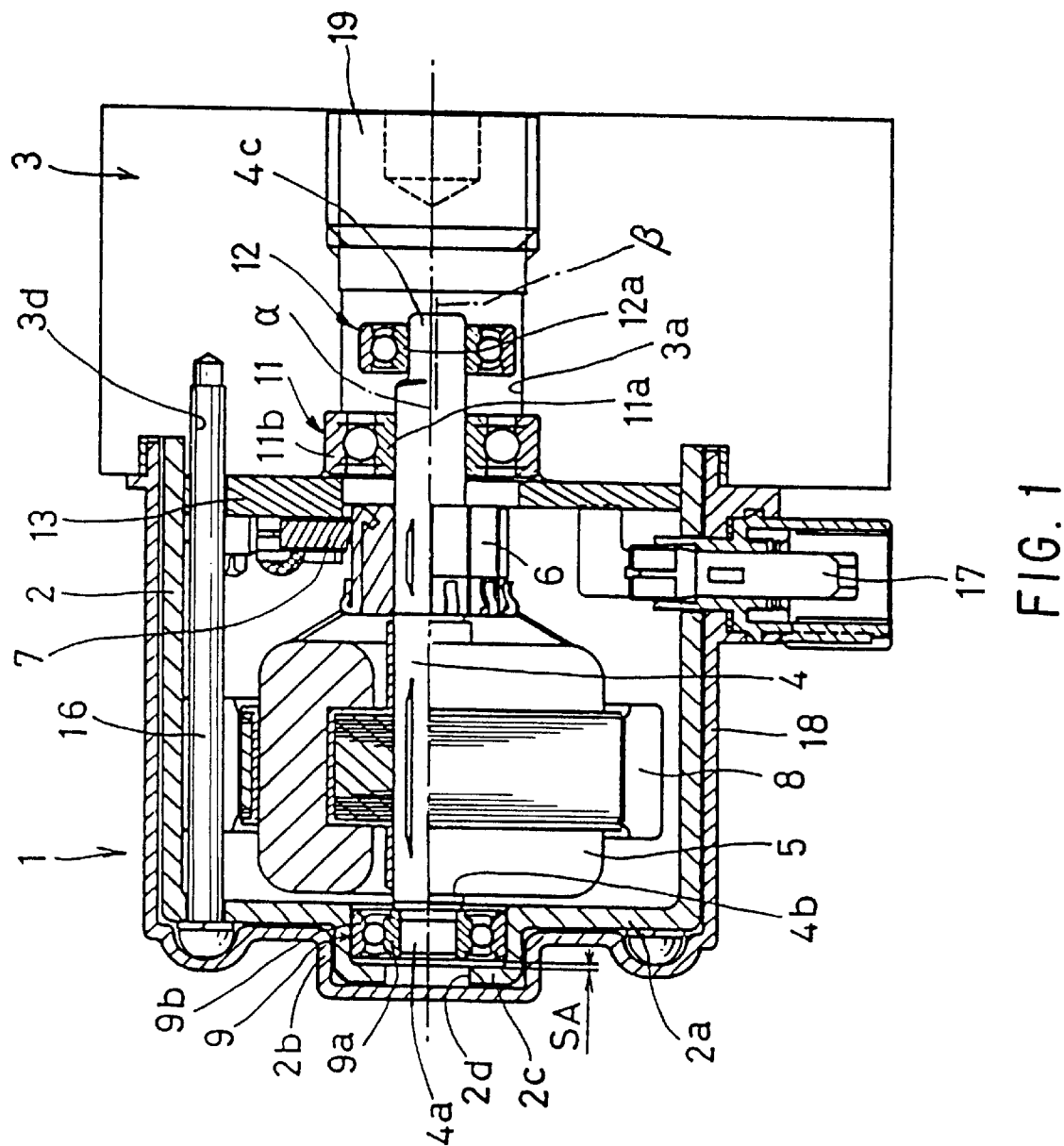
FIG. 1 is a sectional view of an electric motor of the present invention.
Figure 2:
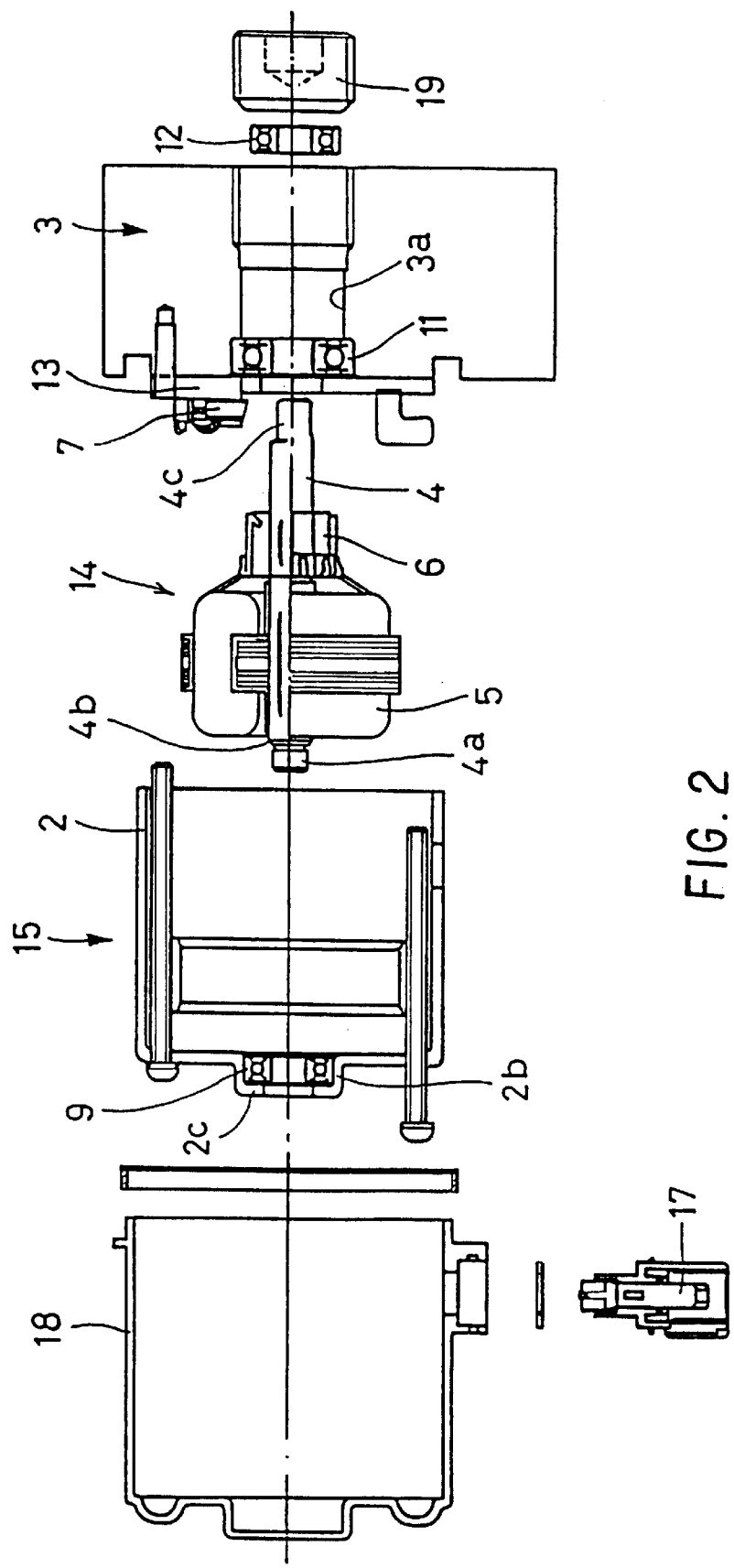
FIG. 2 is an exploded view of the electric motor.

Referring to the drawings, the embodiments of the present invention are now discussed.

An electric motor 1 for an anti-lock braking device is shown in FIG. 1. The electric motor 1 comprises an armature shaft 4 rotatably supported at a yoke 2 at one end and at a pump bracket 3 at the other end. An armature core 5 and a commutator 6 are integrally connected with the armature shaft 4. Brushes 7 are kept in contact with the commutator 6, and permanent magnets 8 are rigidly attached on the inner circumference of the yoke 2.

The yoke 2 has a cylindrical form with a closed end on one side, in which a bearing housing 2b is formed. The bearing housing 2b rotatably supports one end of the armature shaft 4 by first bearings 9. An inner ring 9a of the first bearings 9 is press-fitted around the small diameter support portion 4a formed at the one end of the armature shaft 4, while an outer ring 9b of the first bearings 9 is press-fitted into the inner circular portion of the bearing housing 2b. The press-fitting procedure for the bearings 9 will be described later.

The armature shaft 4 has a step portion 4b (corresponding to the inner ring receiving portion in the present invention)

between its small diameter support portion 4a and its large diameter portion to the support side of the motor (to the side of yoke open end). The step portion 4b restricts the axial displacement of the first bearing inner ring 9a toward the yoke open end. The displacement of the first bearing inner ring 9a toward the opposite direction, namely away from the yoke open end is restricted by the closed end 2c of the bearing housing 2b (corresponding to the outer ring receiving portion in the present invention). The bearing housing closed end 2c is provided with a jig insert hole 2d.

Now let SB represent one of an inner ring gap between the step portion 4b of the armature shaft 4 and the first bearing inner ring 9a opposing the step portion 4b, an outer ring gap between the bearing housing closed end 2c and the first bearing outer ring 9b opposing the closed end 2c, and the sum of the inner ring gap and the outer ring gap, prior to tightening the set bolts 16 to secure the yoke 2 to the pump bracket 3. The gap SB is set to be greater than the axial distortion D of the yoke 2 resulting from the tightening of the set bolts 16 (thus, SB>D). Furthermore, with the set bolts 16 tightened, either the inner ring gap or the outer ring gap is left as a gap SA.

The pump bracket 3 is rigidly mounted to the open end of the yoke 2. The pump bracket 3 has a hollow cylinder portion 3a colinearly aligned with the axis α of the armature shaft 4, and the other end of the armature shaft 4 is projected into the hollow cylinder portion 3a. The other end of the armature shaft 4 is rotatably supported by second bearings 11 in the hollow cylinder portion 3a. The assembling procedure of the second bearings 11 and the armature shaft 4 into the hollow cylinder portion 3a will be discussed later.

The pump bracket 3 contains a variety of components constituting a piston pump for use in the anti-lock braking device, including a connecting rod, a piston, and a cylinder (all of these not shown).

A small-diameter output shaft 4c, the axis β of which is offset from the axis α of the armature shaft 4, is arranged at the other end of the armature shaft 4 projected into the hollow cylinder portion 3a, beyond the position of the second bearings 11. The base of the connecting rod is connected to the offset output shaft 4c via third bearings 12. A piston is attached to the end of the connecting rod, and along with the rotation of the armature shaft 4, the piston reciprocates radially with respect to the armature shaft within the cylinder, thereby feeding brake oil.

The set bolts 16 are inserted from the closed end 2a of the yoke 2 and then screwed into threaded holes 3d formed in the pump bracket 3. The set bolts 16 secure the yoke 2 and the pump bracket 3 as a unitary body.

Figure 3:
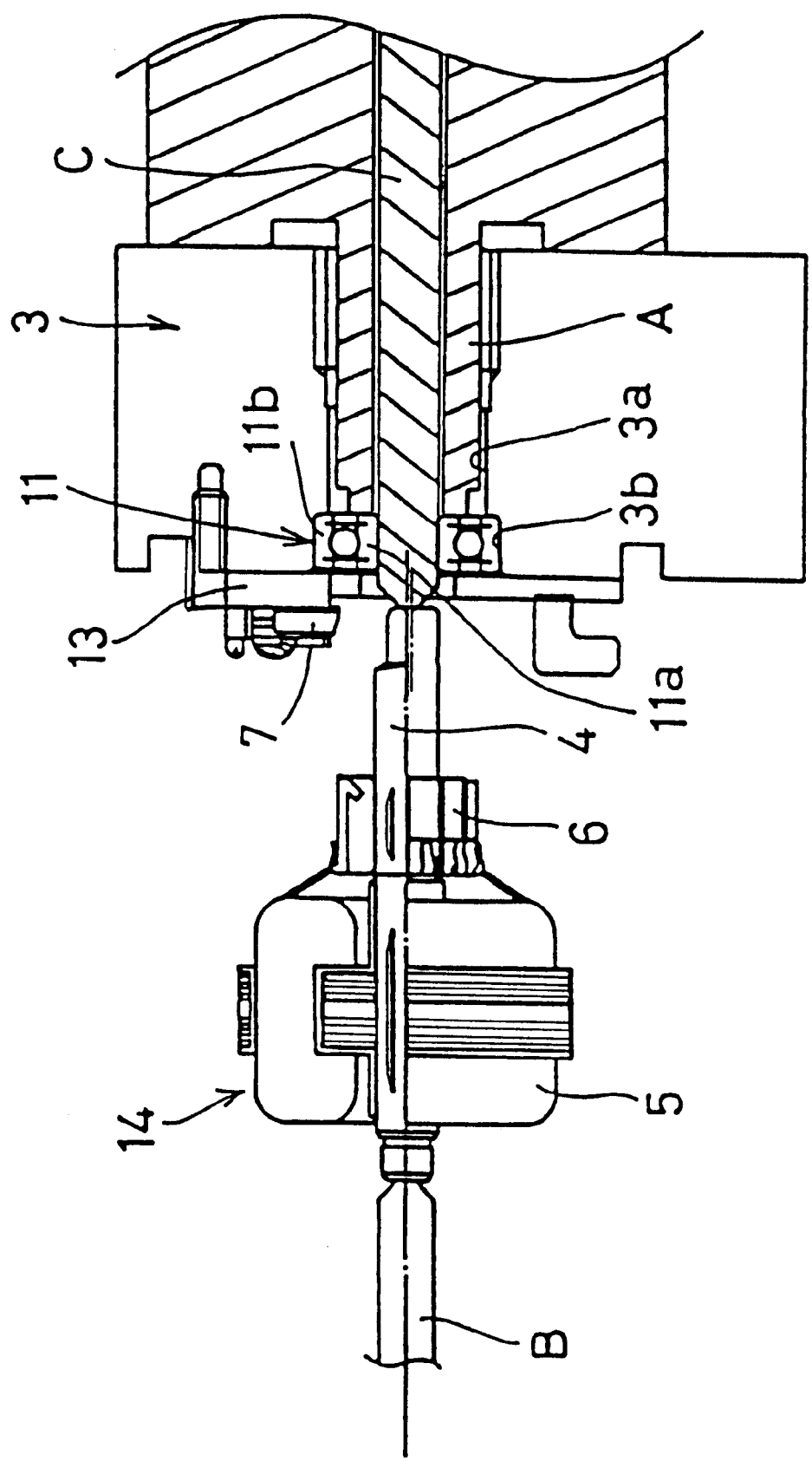
FIG. 3 illustrates the assembling procedure of the electric motor.
Figure 4:
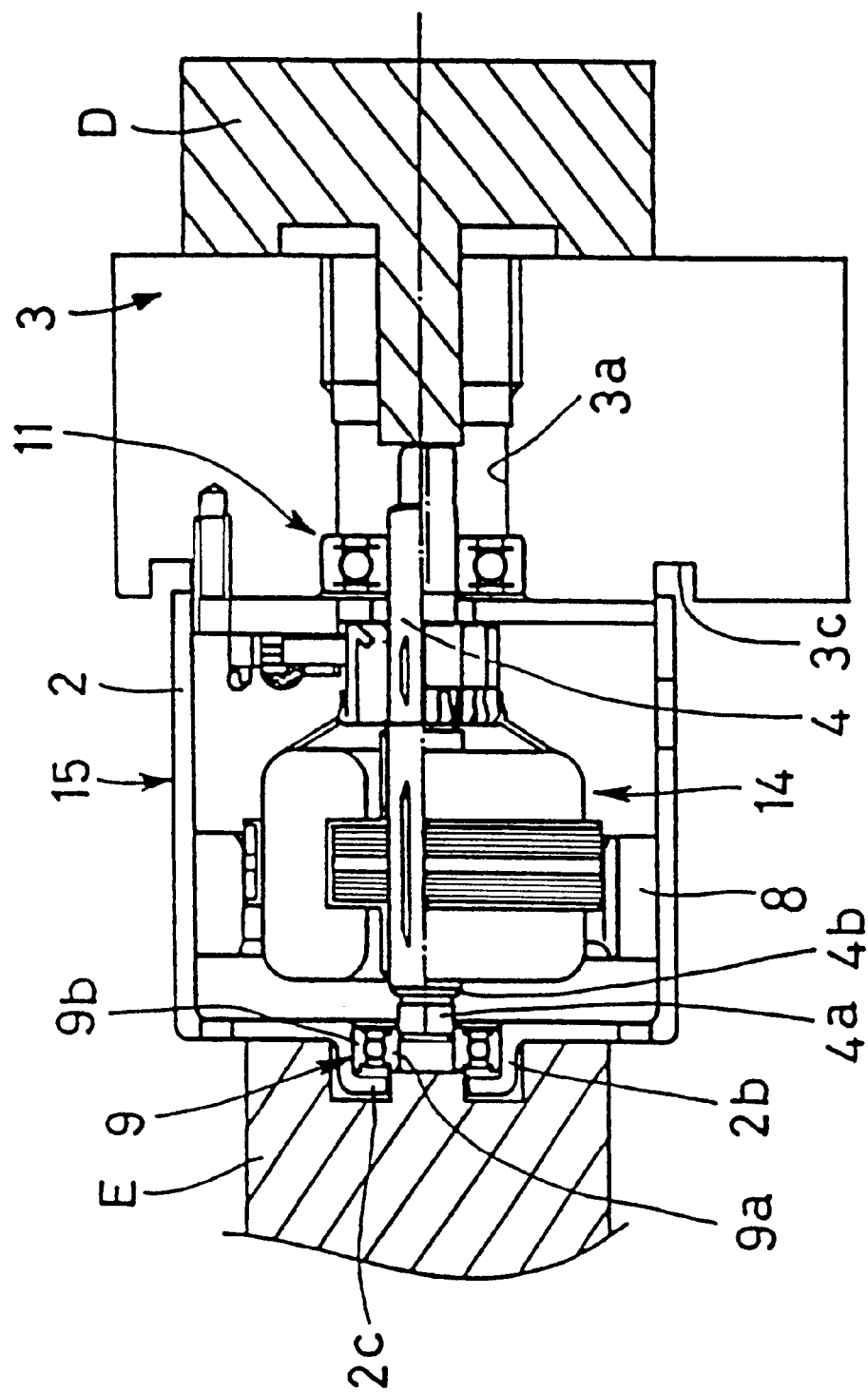
FIG. 4 illustrates the assembling procedure of the electric motor.
Figure 5:
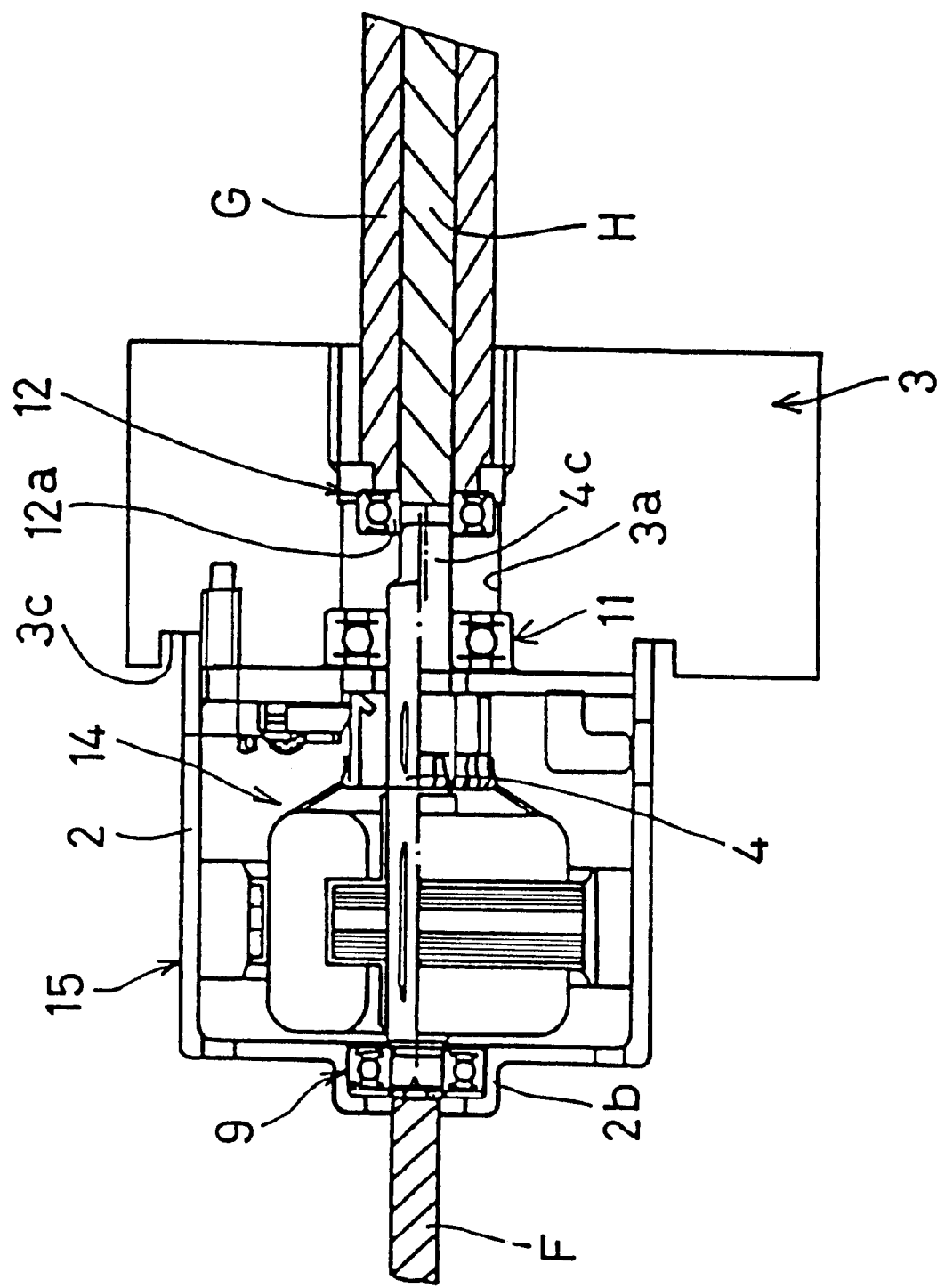
FIG. 5 illustrates the assembling procedure of the electric motor.

Referring to FIGS. 3 through 5, the assembling procedure of the electric motor 1 is now discussed. The outer ring 11b of the second bearings 11 is first press-fitted into a bearing socket 3b formed in the hollow cylinder portion 3a of the pump bracket 3 near its mating end with the yoke 2. A base unit 13 incorporating brushes 7 are then attached to the mating end of the pump bracket 3 with the yoke 2. Jigs A, B and C are used to press-fit, into the inner ring 11a of the second bearings 11, the other end of the armature shaft 4 of the armature assembly 14 into which the armature shaft 4, the armature core 5, the commutator 6 and the like are assembled (see FIG. 3). The jig A is inserted from the side opposite the yoke mounting side to the pump bracket 3, and supports the inner ring 11a of the second bearings 11. The jig B presses the one end of the armature shaft 4. The jig C guides and inserts the other end of the armature shaft 4 into the second bearing inner ring 11a.

The outer ring 9b of the first bearings 9 is press-fitted into the yoke bearing housing 2b of a yoke unit 15 in which permanent magnets 8 are attached on the inner circumference of the yoke 2, until one end of the outer ring 9b opposite the side of the yoke open end abuts the closed end 2c of the bearing housing.

The press-fit load P1 of the outer ring 9b is set to be smaller than the permissible radial load PR of the first bearings 9 (P1<PR). Since the dimensions of the bearing housing 2b vary within the range of tolerances, the actual press-fit load P1 of the outer ring 9b is different from product to product within a range below the permissible radial load PR of the first bearings 9.

Next, the inner ring 9a of the first bearings 9, the outer ring 9b of which is already fitted into the yoke unit 15, is press-fitted around the support portion 4a at the one end of the armature shaft 4 of the armature assembly 14 that is secured to the pump bracket 3, using jigs D and E (see FIG. 4). The jig D supports the other end of the armature shaft 4 and the pump bracket 3. The jig E is inserted through the jig insert hole 2d of the yoke 2 to press the first bearing inner ring 9a.

The press-fit load P2 of the inner ring 9a is set to be smaller than the permissible axial load PA of the first bearings 9 (P2<PA). If the pressing of the inner ring 9a is continuously made, the open end face of the yoke 2 will abut the bottom surface of a circular socket portion 3c formed in the pump bracket 3 on its mating side with the yoke. The pressing action is still continued until the constant pressure load PP of the press, specifically, the jig E, is reached. The constant pressure load PP is set to be smaller than the permissible axial load PA of the first bearings 9 but greater than the press-fit load P2 of the first bearing inner ring 9a (thus, P2<PP<PA).

The open end of the yoke 2 is engaged with the socket portion 3c formed in the pump bracket 3, in a spigot joint fashion. Even if there is an offset in axes of the first bearings 9 press-fitted into the yoke 2 and of the second bearings 11 press-fitted into the pump bracket 3, the axis offset may be accommodated by the spigot joint portion.

The third bearings 12 are press-fitted around the offset output shaft 4c mounted on the yoke unit 15, using jigs F, G, and H (see FIG. 5). The jig F supports the one end of the armature shaft 4, the jig G presses the third bearings 12, and the jig H guides and inserts the inner ring 12a of the third bearings 12 around the offset output shaft 4c.

With the third bearings 12 press-fitted, the set bolts 16 are inserted from the closed end 2a of the yoke 2 and screwed into the threaded holes 3d formed in the pump bracket 3 to secure the yoke 2 to the pump bracket 3.

Shown in FIG. 1 are a coupler 17 that is electrically connected to an external power supply that feeds power to the brushes 7, a waterproof resin cover covering the entire yoke 2 for waterproofness of the electric motor 1, and a seal member 19 for sealing the side of the hollow cylinder portion 3a opposite its mating side with the yoke.

In the stage prior to tightening the set bolts 16 to secure the yoke 2 to the pump bracket 3, the press-fit load P1 of the outer ring 9b, the press-fit load P2 of the inner ring 9a of the first bearings 9, the permissible axial load PA of the first bearings 9, and the constant pressure load PP of the press during the pressing of the inner ring 9a are differently related as below from product to product.

a) Press-fit load of inner ring<press-fit load of outer ring<constant pressure load of press<permissible axial load (P2<P1<PP<PA).

b) Press-fit load of outer ring<press-fit load of inner ring<constant pressure load of press<permissible axial load (P1<P2<PP<PA).

c) Press-fit load of inner ring<constant pressure load of press<press-fit load of outer ring<permissible axial load (P2<PP<P1<PA).

d) Press-fit load of inner ring<constant pressure load of press<permissible axial load<press-fit load of outer ring (P2<PP<PA<P1).

In a) and b) out of the above cases a)–d), the press-fit load P1 of the outer ring 9b is smaller than the constant pressure load PP of the press (P1<PP). Now, the inner ring 9a is press-fitted around the armature shaft 4. When the inner ring 9a is further pressed even after the open end of the yoke 2 abuts the bottom surface of the socket portion 3c formed in the pump bracket 3, the outer ring 9b moves along with the inner ring 9a toward the open end of the yoke, because the press-fit load P1 of the outer ring 9b is smaller than the constant pressure load PP. This movement is stopped by the step portion 4b formed on the armature shaft 4 when the inner ring 9a touches it, and thus pressing of the inner ring 9a stops when the constant pressure load PP of the press is reached. The gap SB is left between the closed end 2c of the bearing housing 2 and the outer ring 9b (see FIG. 7(X)). As already described, the gap SB is set to be greater than the axial distortion D of the yoke 2 resulting from the tightening of the set bolts 16 (thus, SB>D).

When the set bolts 16 are tightened by a constantly controlled torque to secure the yoke to the bracket 3, the yoke 2 is deformed to be shortened in its axial length. Since the gap SB between the bearing housing closed end 2c and the outer ring 9b is greater than the deformation D of the yoke 2 (SB>D), the bearing housing closed end 2c does not press the outer ring 9b toward the yoke open end even if the yoke 2 is deformed to be shortened, and the tightening force of the set bolts 16 is not exerted as an axial load. With the set bolts 16 tightened, a gap SA (SA=SB−D) obtained by subtracting the deformation D from the gap SB prior to tightening, is left between the bearing housing closed end 2c and the outer ring 9b (see FIG. 7(Y)).

Figure 8Y:
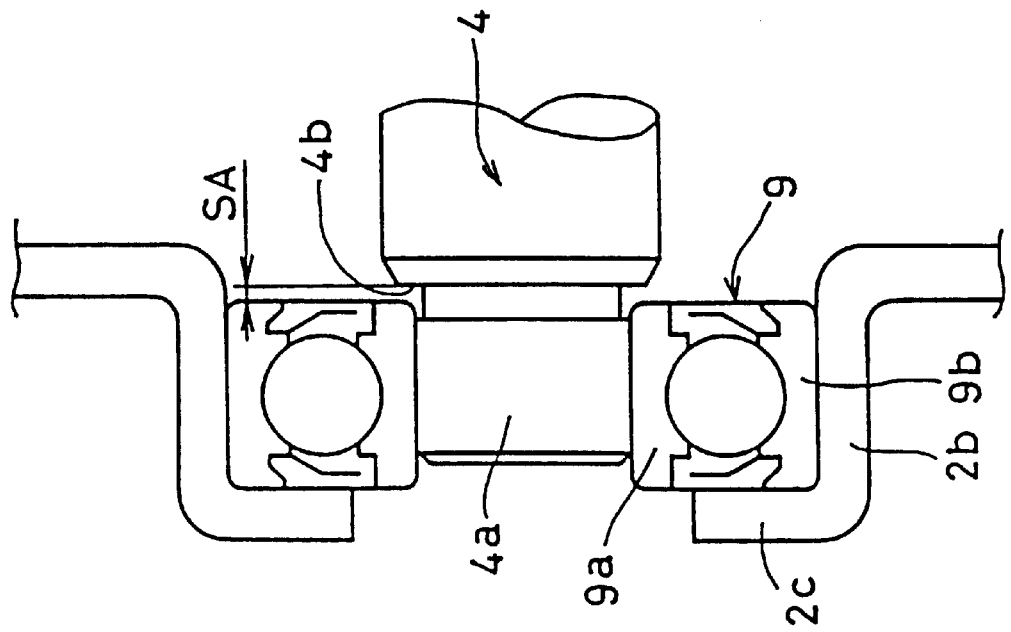
FIGS. 8(X) and 8(Y), corresponding to cases c) and d), are an enlarged view of the first bearing section with its inner ring press-fitted and an enlarged view of the first bearing section with its set bolts tightened, respectively.
Figure 8X:
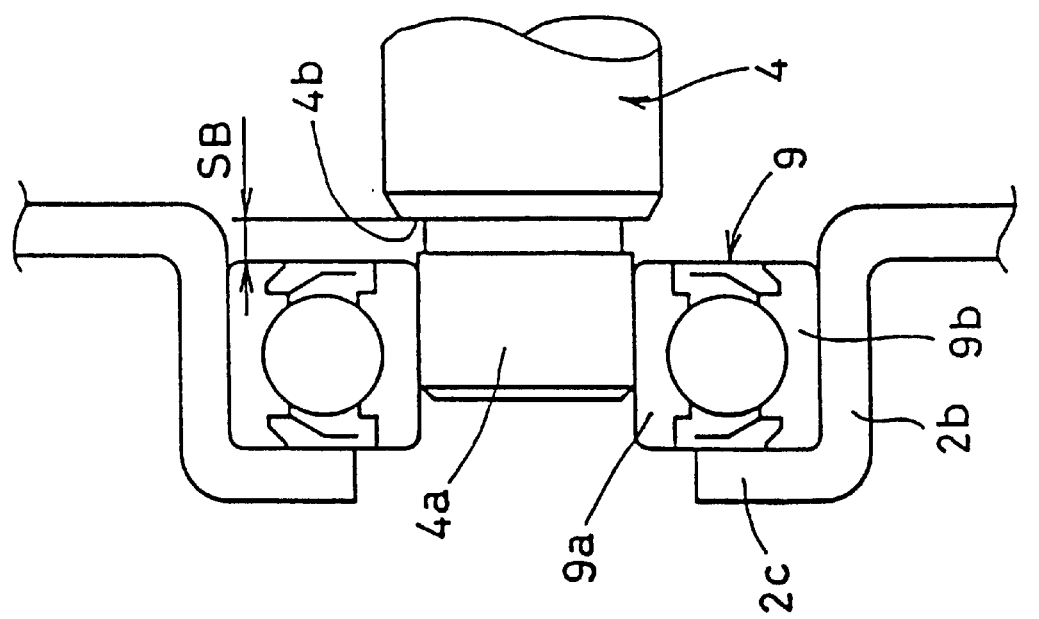
Figure 10:
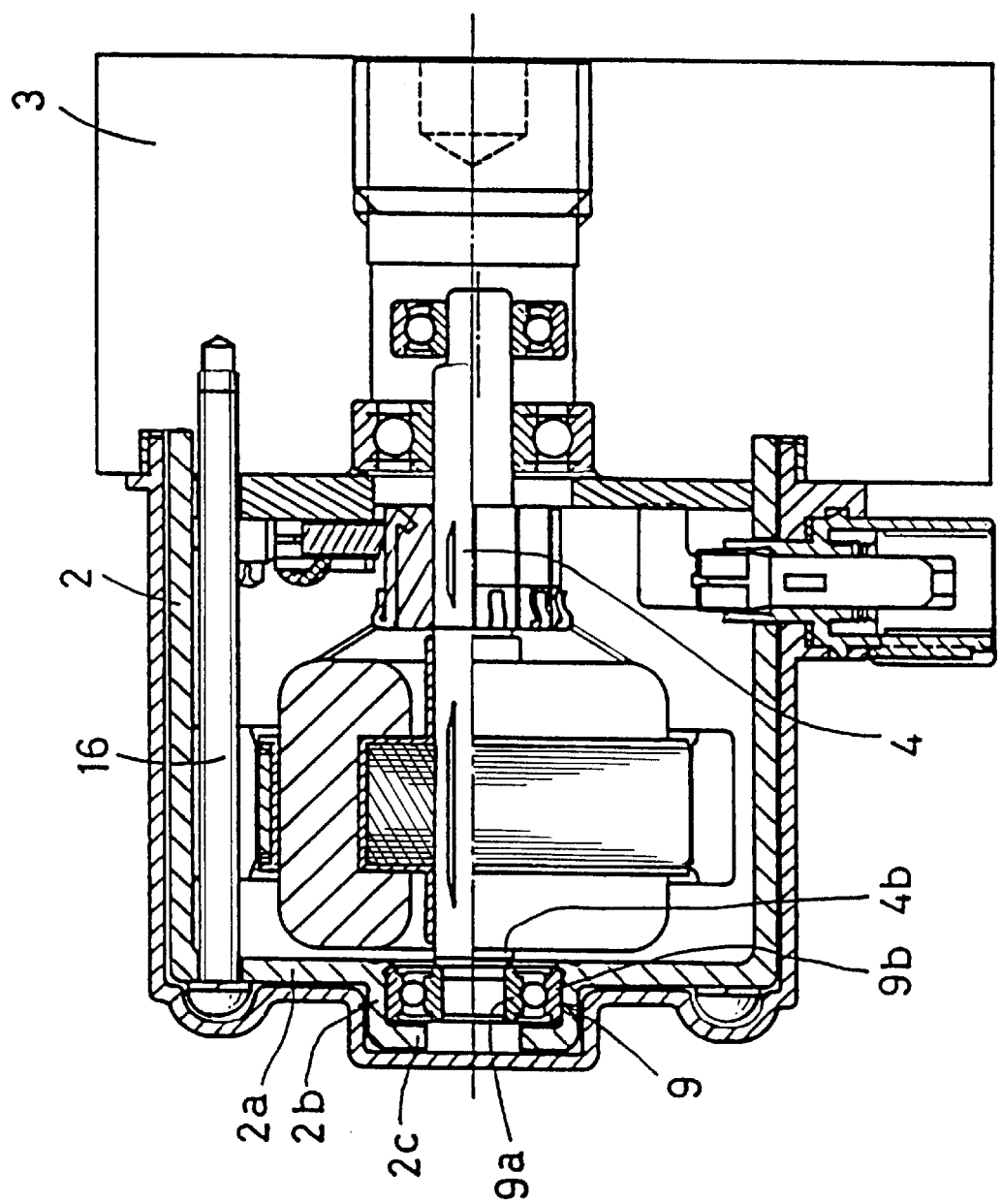
FIG. 10 is a sectional view of an electric motor illustrating the problem of the prior art.
Figure 11:
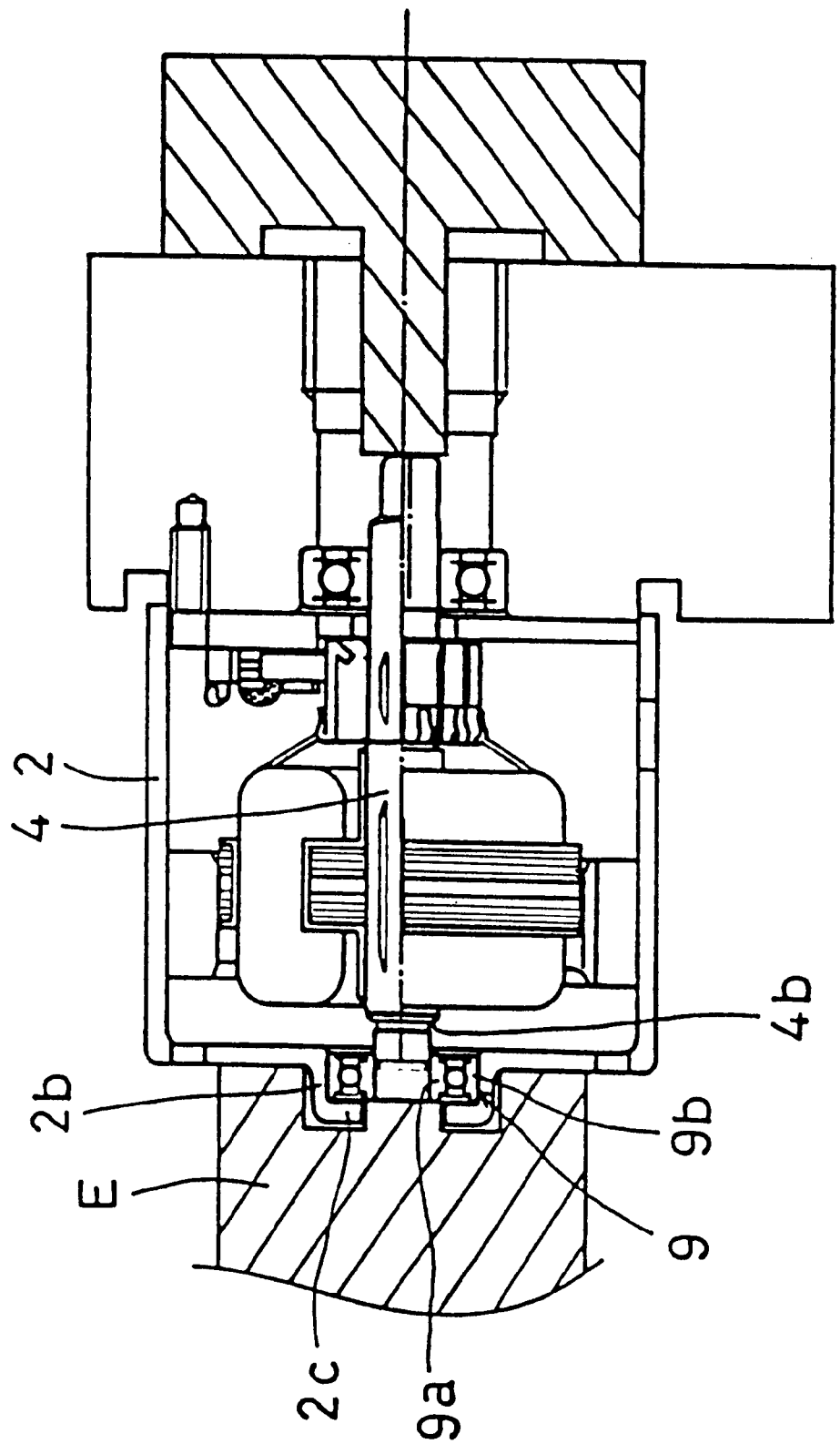
FIG. 11 is a diagram of the assembling procedure of the motor illustrating the problem of the prior art.
Figure 13X:
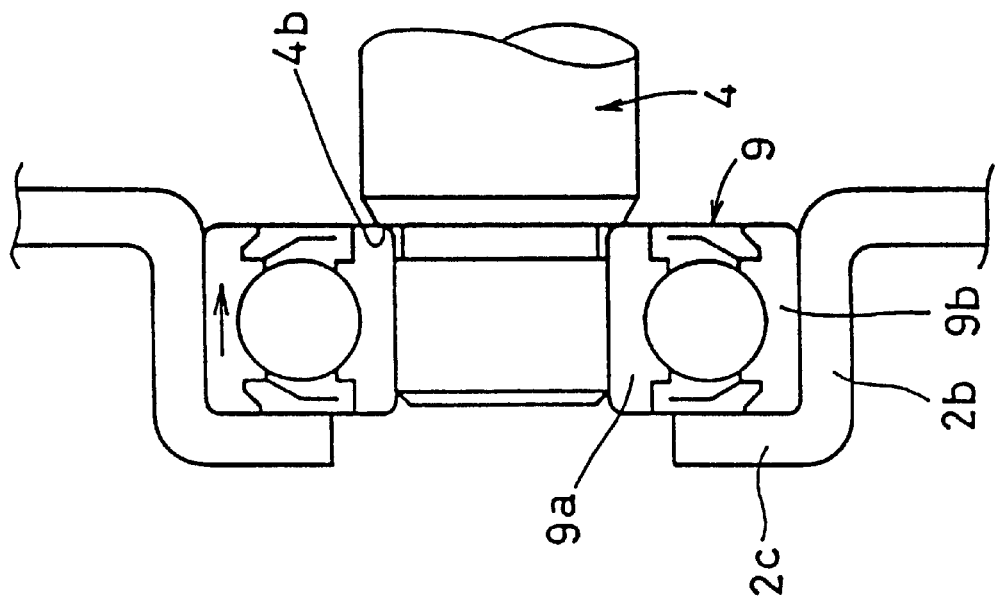
FIGS. 13(X) and 13(Y), corresponding to cases a) and b) in the prior art, are an enlarged view of the bearings with their inner ring press-fitted and an enlarged view of the bearings with their set bolts tightened, respectively.
Figure 13Y:
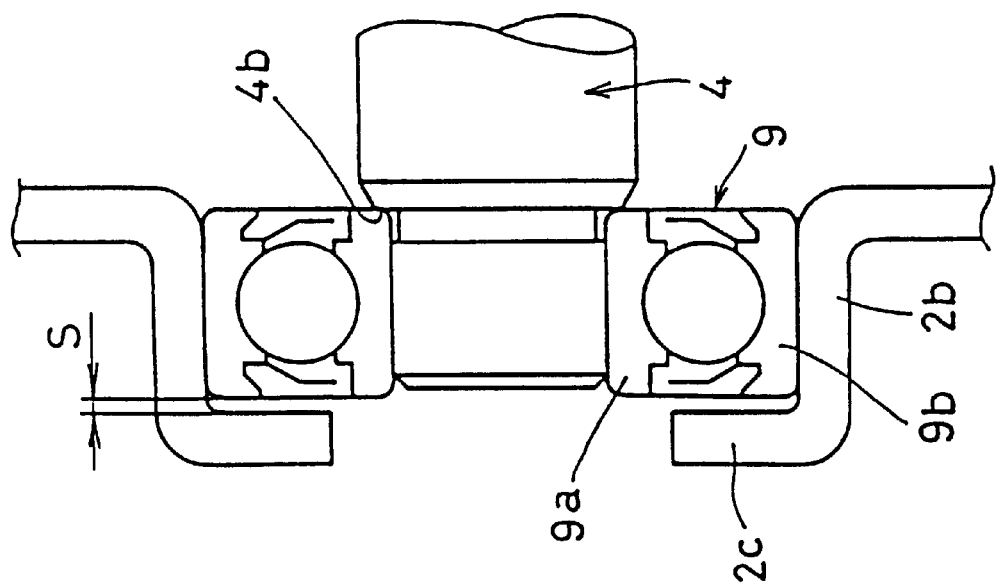
Figure 14X:
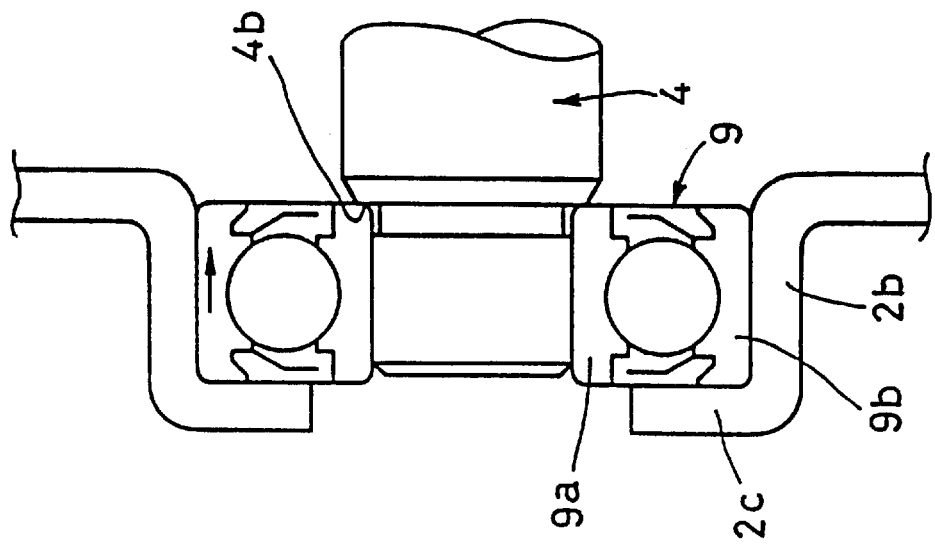
FIGS. 14(X) and 14(Y), corresponding to cases c) and d) in the prior art, are an enlarged view of the bearings with their inner ring press-fitted and an enlarged view of the bearings with their set bolts tightened, respectively.
Figure 14Y:
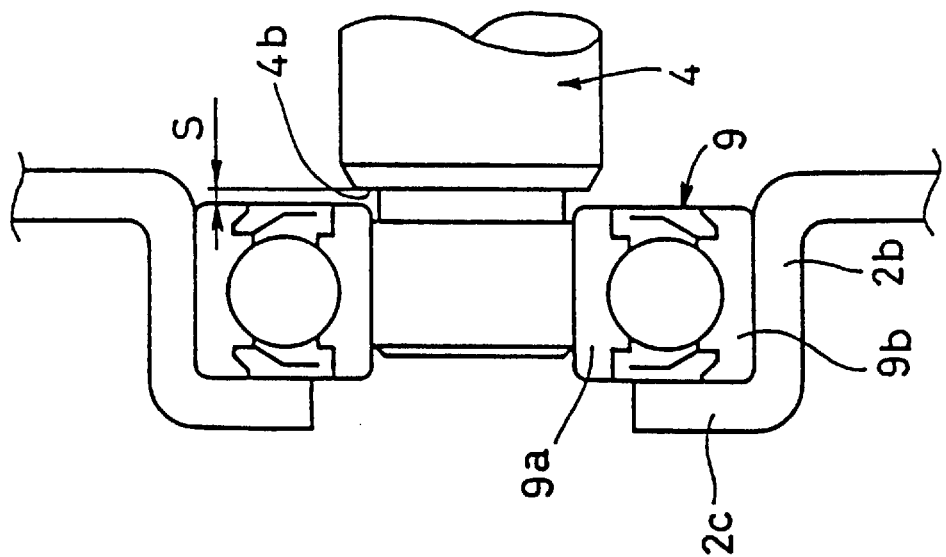

In cases c) and d), the press-fit load P1 of the outer ring is greater than the constant pressure load PP of the press (P1>PP). In the press-fitting of the inner ring 9a around the armature shaft 4, the inner ring 9a may be further pressed after the open end of the yoke 2 abuts the bottom surface of the socket portion 3c formed in the pump bracket 3. Since the press-fit load P1 of the outer ring 9b is greater than the constant pressure load PP of the press, the outer ring 9b remains still, and thus neither the inner ring 9a nor the outer ring 9b moves. When the constant pressure load PP is reached, the pressing of the inner ring 9a is stopped. The gap SB is left between the inner ring 9a and the step portion 4b of the armature shaft 4 (see FIG. 8(X)). As already described, the gap SB is set to be greater than the axial distortion D of the yoke 2 resulting from the tightening of the set bolts 16 (thus, SB>D).

When the yoke 2 is deformed to be shortened in its axial length with the set bolts 16 tightened, the outer ring 9b of the bearings 9 is urged toward the yoke open end by the closed end 2c of the bearing housing, and thus both the inner ring 9a and the outer ring 9b are moved toward the yoke open end. As already described, the gap SB between the inner ring 9a and the step portion 4b of the armature shaft is greater than the deformation D of the yoke 2 (SB>D), the displacement of the first bearings 9 toward the yoke open end side along with the deformation of the yoke 2 ends before the inner ring 9a touches the step portion 4b. The tightening force of the set bolts 16 is not exerted as a load in excess of the permissible axial load PA. With the set bolts 16 tightened, a gap SA (SA=SB−D) obtained by subtracting the deformation D from the gap SB prior to tightening, is left between the inner ring 9a and the step portion 4b of the armature shaft (see FIG. 8(Y)).

Besides cases a) through d), there is a case in which the press-fit load P1 of the outer ring 9b is approximately equal to the constant pressure load PP (P1≈PP). In the press-fitting of the inner ring 9a around the support portion 4a of the armature shaft 4, when the inner ring 9a is further pressed after the open end face of the yoke 2 abuts the bottom surface of the socket portion 3c formed in the pump bracket 3, the following three cases are contemplated because the press-fit load P1 of the outer ring 9b is approximately equal to the constant pressure load PP.

e) Both the inner and outer rings 9a, 9b are displaced toward the yoke open end until the inner ring 9a abuts the step portion 4b of the armature shaft 4.

f) Although both the inner and outer rings 9a, 9b are displaced toward the yoke open end, they stop before the inner ring 9a abuts the step portion 4b of the armature shaft 4.

g) The outer ring 9b is not displaced, and thus the inner ring 9a is not displaced, either.

Case e) is equivalent to cases a) and b), and case g) is equivalent to cases c) and d). Now, case f) will be discussed. With the inner ring 9a press-fitted, the first bearing 9 touches neither the bearing housing closed end 2c nor the step portion 4b of the armature shaft. More specifically, an outer ring gap SaB is left between the bearing housing closed end 2c and the outer ring 9b, and an inner ring gap SiB is left between the inner ring 9a and the step portion 4b of the armature shaft (see FIG. 9(X)). The sum SB (SB=SaB+SiB) of these gaps is set to be greater than the deformation D of the yoke 2 after the tightening of the set bolts (SB>D).

When the yoke 2 is deformed to be shortened in its axial length with the set bolts 16 tightened, the bearing housing closed end 2c does not press the outer ring 9b toward the yoke open end as long as the deformation D is equal to or smaller than the outer ring gap SaB (D≦SaB). The tightening force of the set bolts 16 is not exerted as an axial load on the first bearings 9. When the deformation D is greater than the outer ring gap SaB (D>SaB), the outer ring 9b together with the inner ring 9a is displaced toward the yoke open end along with the deformation of the yoke 2. As already described, the gap SB, the sum of the outer ring gap SaB and the inner ring gap SiB, is set to be greater than the deformation D of the yoke 2 (SB>D). The displacement of the first bearings 9 along with the deformation of the yoke 2 ends before the inner ring 9a touches the step portion 4b of the armature shaft. Thus, the tightening force of the set bolts 16 is not exerted as a load in excess of the permissible axial load PA. In case f), with the set bolts 16 tightened, a gap SA (SA=SB−D) obtained by subtracting the deformation D from the gap SB prior to tightening, is left at least either between the bearing housing closed end 2c and the outer ring 9b or between the inner ring 9a and the step portion 4b of the armature shaft (see FIG. 9(Y)).

In the above arrangement, the first and second bearings 9, 11 rotatably support the armature shaft 4, and their inner rings 9a, 11a are respectively press-fitted around the armature shaft 4, and their outer rings 9b, 11b are press-fitted into the yoke bearing housing 2b and the pump bracket hollow cylinder portion 3a, respectively. Even if the armature shaft 4 is subject to a radial load under the piston reciprocal motion driven by the motor, the bearings 9 and 11 are free from axial and radial motion. The above arrangement controls noise while contributing to enhanced pump performance. In case the yoke 2 is deformed to be shortened in its axial length when the set bolts 16 are tightened to secure the yoke 2 to the pump bracket 3, the outer ring gap SB between the bearing housing closed end 2c and the first bearing outer ring 9b or the inner ring gap SB between the step portion 4b of the armature shaft 4 or the sum gap SB obtained by summing both the inner and outer ring gaps, prior to tightening the set bolts 16, is set to be greater than the axial deformation D of the yoke 2 (SB>D). The tightening force of the set bolts 16 is not exerted on the first bearings 9 as a load in excess of the permissible axial load PA.

An additional manufacturing step of caulking for fixing a yoke is eliminated, which is needed in the prior art if there is a possibility that a load in excess of the permissible axial load PA acts on the first bearings 9 with the set bolts being tightened. The mere press-fitting operation of the first and second bearings 9, 11 assembles them in a manner that prevents the bearings 9, 11 from being displaced axially and radially, thereby reducing manufacturing steps and improving production efficiency.

What is claimed is:

1. An armature shaft support structure for use in an electric motor, comprising:

a cylindrical yoke opened at one end and having an opposite closed end;

a bracket mounted at the open end of the yoke;

set bolts that are screwed in and tightened from the closed end of the yoke at an inner side of an inner periphery of the yoke to secure the yoke to the bracket, said yoke having a predetermined axial deformation upon tightening of the set bolts to secure the yoke to the bracket;

bearings and a bearing housing that is formed in the closed end of the yoke, and an armature shaft which is at one end rotatably supported by the bearings in the bearing housing with an outer ring of the bearings press-fitted into the bearing housing and an inner ring of the bearings press-fitted around the armature shaft so the bearings are free from axial and radial motion relative to the armature shaft upon tightening of the set bolts to secure the yoke to the bracket;

wherein the armature shaft at one end has an inner ring receiving portion that restricts the displacement of the inner ring toward the yoke open end;

the bearing housing has an outer ring receiving portion that restricts the displacement of the outer ring in the direction opposite to the direction toward the yoke open end; and a gap chosen from the group having an inner ring gap between the inner ring receiving portion and the inner ring opposing the inner ring receiving portion, an outer ring gap between the outer ring receiving portion and the outer ring opposing the outer ring receiving portion, and a sum of the inner ring gap and the outer ring gap, the gap before tightening of the set bolts being set to a predetermined value greater than the predetermined axial deformation.

2. An armature shaft support structure for use in an electric motor, comprising:

a cylindrical yoke opened at one end and having an opposite closed end;

a bracket mounted at the open end of the yoke;

set bolts that are screwed in and tightened from the closed end of the yoke at an inner side of an inner periphery of the yoke to secure the yoke to the bracket;

bearings and a bearing housing that is formed in the closed end of the yoke, and an armature shaft which is at one end rotatably supported by the bearings in the bearing housing with an outer ring of the bearings press-fitted into the bearing housing and an inner ring of the bearings press-fitted around the armature shaft so the bearings are free from axial and radial motion relative to the armature shaft upon tightening of the set bolts to secure the yoke to the bracket;

wherein the armature shaft at one end has an inner ring receiving portion that restricts the displacement of the inner ring toward the yoke open end;

the bearing housing has an outer ring receiving portion that restricts the displacement of the outer ring in the direction opposite to the direction toward the yoke open end; and a gap is left at least between the inner ring receiving portion and the inner ring opposing the inner ring receiving portion and between the outer ring receiving portion and the outer ring opposing the outer ring receiving portion, when the set bolts are tightened to secure the yoke to the bracket.

3. A method of assembling an armature shaft and its support structure within an electric motor, the electric motor including a cylindrical yoke with an open end and an opposite closed end, a bracket mounted at the open end of the yoke, set bolts passing through the closed end of the yoke at an inner side of an inner periphery of the yoke and being threaded into the bracket to secure the yoke to the bracket, a bearing housing being formed in the closed end of the yoke, bearings mounted within said bearing housing and including an outer ring press-fit into said bearing housing and an inner ring, an armature shaft being press-fit into said inner ring, said armature shaft having an inner ring receiving portion for restricting displacement of said inner ring along said armature shaft toward said yoke open end and said bearing housing having an outer ring receiving portion for restricting displacement of said outer ring within said bearing housing toward said yoke closed end; said method comprising the steps of:

a) press-fitting said outer ring into said bearing housing; then b) press-fitting said inner ring over said armature shaft; and then c) tightening said set bolts to join said yoke with said bracket, wherein the combination of steps (a) and (b) results in the bearings being free from axial and radial motion relative to the armature shaft and one of an inner ring gap between said inner ring receiving portion and said inner ring opposing the inner ring receiving portion, an outer ring gap between said outer ring receiving portion and said outer ring opposing the outer ring receiving portion, and the sum of said inner ring gap and said outer ring gap being greater than an axial deformation of said yoke resulting from step (c).

* * * * *